US008132203B2

(12) United States Patent
de Heer (10) Patent No.: US 8,132,203 B2
(45) Date of Patent: Mar. 6, 2012

(54) IN-PROGRAM CONTENT TARGETING

(75) Inventor: David L. de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 1086 days.

(21) Appl. No.: 11/239,763

(22) Filed: Sep. 30, 2005

(65) Prior Publication Data

US 2007/0079325 A1    Apr. 5, 2007

(51) Int. Cl.
*H04N 7/10* (2006.01)
*H04N 7/025* (2006.01)
*H04N 7/173* (2006.01)

(52) U.S. Cl. .......... 725/34; 725/32; 725/35; 725/36
(58) Field of Classification Search .......... 725/32, 725/34–36, 93–95; 726/35
See application file for complete search history.

(56) References Cited

U.S. PATENT DOCUMENTS

| | | | |
|---|---|---|---|
| 5,446,919 A * | 8/1995 | Wilkins | 725/35 |
| 5,794,210 A | 8/1998 | Goldhaber et al. | |
| 5,886,995 A * | 3/1999 | Arsenault et al. | 370/477 |
| 5,948,061 A | 9/1999 | Merriman et al. | |
| 6,002,393 A | 12/1999 | Hite et al. | |
| 6,052,554 A | 4/2000 | Hendricks et al. | |
| 6,119,098 A | 9/2000 | Guyot et al. | |
| 6,714,545 B1 | 3/2004 | Hugenberg et al. | |
| 6,771,290 B1 | 8/2004 | Hoyle | |
| 6,904,408 B1 | 6/2005 | McCarthy et al. | |
| 7,146,627 B1 * | 12/2006 | Ismail et al. | 725/47 |
| 2002/0144262 A1 * | 10/2002 | Plotnick et al. | 725/32 |
| 2004/0210944 A1 | 10/2004 | Brassil | |
| 2005/0038904 A1 | 2/2005 | Dougall | |

FOREIGN PATENT DOCUMENTS

WO      WO 99/63759      12/1999

OTHER PUBLICATIONS

Casale Media, "Operating System", retrieved from the Internet on Sep. 29, 2005: <http://casalemedia.com/29995.html>.
WHP-TV, "The Power of Internet and Television", retrieved from the Internet on Sep. 29, 2005: <http://www.whptv.com/advertise.aspx>.
WXXA-TV, "Advertise on fox23news.com; The Power of Internet and Television", retrieved from the Internet on Sep. 29, 2005: <http://fox23news.com/adsonfox/>.
CNet Asia Enterprise Tech, "Publishers Description", retrieved from Internet on Sep. 29, 2005: <http://asica.cnet.com/whitepapers/0,39035785,39040035p,00.htm>.

* cited by examiner

*Primary Examiner* — Hunter Lonsberry
(74) *Attorney, Agent, or Firm* — Lee & Hayes, PLLC (57) ABSTRACT

In-program content targeting is described. A default data stream containing default content associated with multiple segments of a particular program is generated and transmitted. An alternate data stream containing alternate content for one or more of the multiple segments is also generated and transmitted. A client device receiving the default content via the default data stream detects the availability of alternate content via the data stream. Based on profile data associated with the client device (or a user of the client device) and profile data associated with the alternate content, the client device may access the alternate data stream for one or more segments of the particular program.

22 Claims, 7 Drawing Sheets

IN-PROGRAM CONTENT TARGETING

BACKGROUND

Diffusion of audience is a big problem facing major television networks, including both broadcast and cable networks. Market share and ratings points are leaving the major networks, particularly during Prime Time, as viewers migrate to content that's more relevant to them. It is expected that this trend will continue, and even increase, as technology advances and IP-based networks enable the availability of large numbers of new channels. As a result, because the large networks will have fewer viewers, advertisers will be less interested in advertising via the large networks. However, if networks could increase the relevancy of their programs to a large population, advertisers would be more willing to continue advertising via the large networks.

SUMMARY

In-program content targeting is described. A default data stream that includes default content for a particular program is generated and transmitted over a network to one or more client devices. One or more alternate data streams are also transmitted, where each alternate data stream includes alternate content that may be substituted for portions of the default content of the particular program. When the client device, accessing the default data stream determines that alternate content is available, the client device may switch to the alternate data stream for at least a portion of the program. The decision of whether or not to switch to the alternate data stream may be made based on a comparison of profile data associated with the client device (or a user of the client device) and profile data associated with the alternate content.

DETAILED DESCRIPTION

In-program content targeting may be implemented to increase the relevancy of content being presented to consumers, and thereby create a more valuable ad proposition. A default program is transmitted via multicast and is available to a viewer via a client device. If the viewer has opted in for targeting, then the client device checks metadata associated with the data stream to determine when alternate content will be available. If alternate content is available, the client compares the metadata of the associated content with the viewer's profile. If there is a match, the client switches streams to the alternate content. After the alternate content ends, the client switches back to the initial multicast stream. This technology enables scenarios such as the nightly news targeting segments for the West, Mid-West, South, and East. Alternatively, it enables a video music channel to create G, PG, and R rated programs based off a single data steam, and targeted to appropriate households. Furthermore, network operators may increase their revenue by charging more to provide targeted content (due to the increased bandwidth requirements). Network operators may also charge more for advertisements presented along with targeted content.

Many existing media entertainment systems are capable of delivering targeted advertising to consumers based on user profile data. In some implementations, multiple ads are transmitted to a client device where they are stored and then presented to a viewer at an appropriate point during a broadcast or on-demand program. Alternatively, multiple ads may be transmitted to the client device in "real-time", and the client device makes a determination as to which of the multiple ads to present to the viewer.

Transmitting multiple advertisements to enable targeted advertising is relatively inexpensive in terms of required bandwidth, which is why it has been technically feasible. That is, because advertisements are typically quite small in size (e.g., approximately 30 seconds in length), not all television ads are targeted, and ads on different television channels don't in general line up exactly in time, it is highly probable that the same bandwidth used for sending one targeted advertisement can be reused for sending another targeted advertisement at a slightly different time. Accordingly, existing targeted advertising systems do not require significantly more bandwidth than systems that do not support targeted advertising. In-program content targeting differs from targeted advertising in several ways, including the fact that many systems that are able to support targeted advertising may not be able to support in-program content targeting due to bandwidth limitations.

The following discussion is directed to in-program content targeting. While features of in-program content targeting can be implemented in any number of different computing environments, they are described in the context of the following exemplary implementations.

Figure 1:
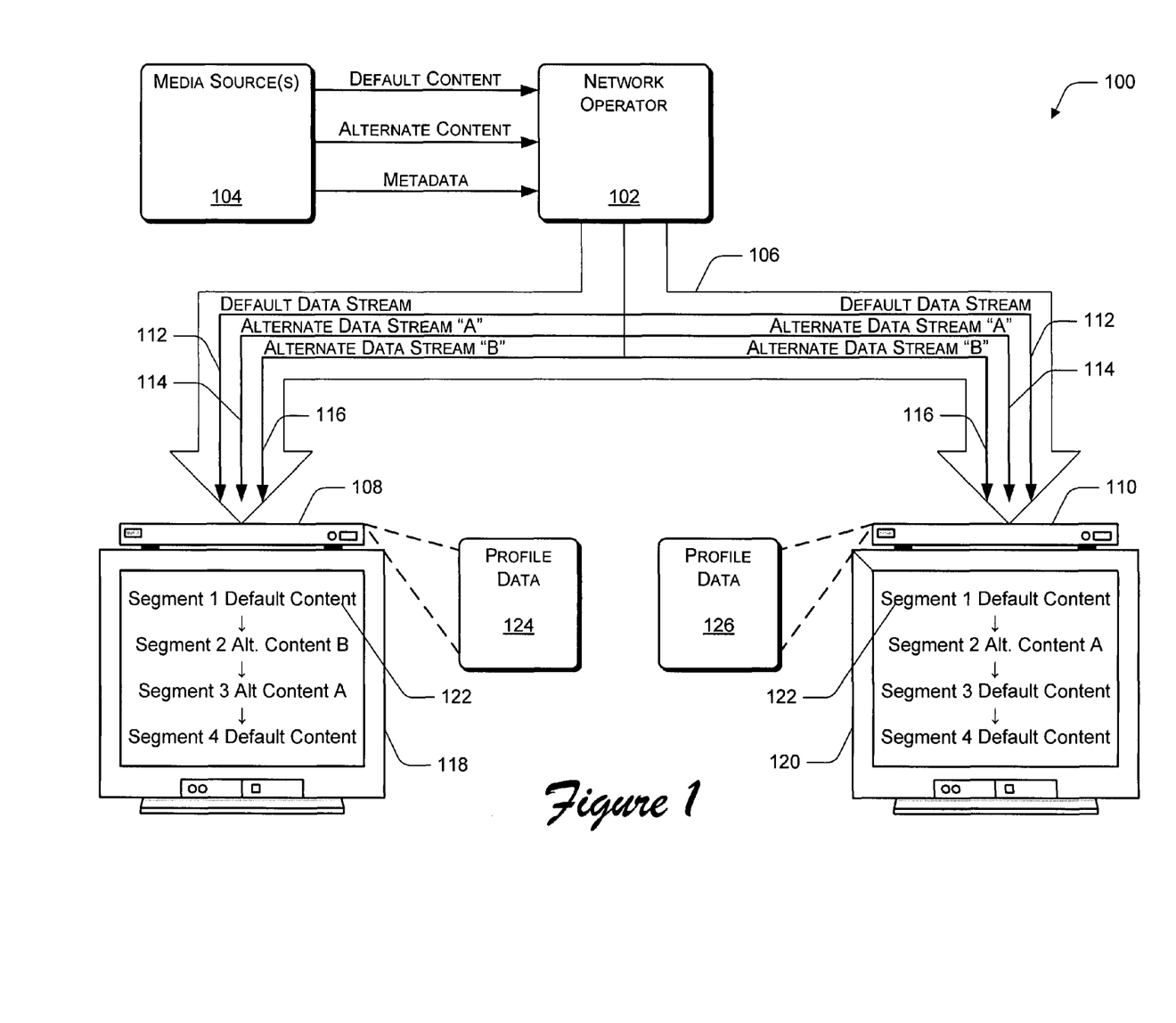
FIG. 1 is a pictorial diagram that illustrates an exemplary network environment in which in-program content targeting may be implemented.

FIG. 1 illustrates an exemplary network environment 100 in which in-program content targeting may be implemented. Network operator 102 receives program content from one or more media sources 104. Media source 104 may represent any type of entity capable of providing media content, such as a broadcast network or a movie production company. In the described exemplary implementation, media source(s) 104 provide default content that makes up an entire program (e.g., a television program or a movie) and at least one alternate content segment that corresponds to a portion of the entire program. Along with the alternate content segment, media source 104 provides metadata that indicates when and to whom the alternate content is to be presented instead of the default content.

For example, a national news program can easily be thought of as having multiple segments. To appeal to a wider range of viewers, one or more segments of the newscast may be targeted. For example, weather and sports segments may be targeted based on geographic region, while health interest stories may be targeted based on age and/or gender.

As another example, a stand-up comedy program may be segmented and alternate content may be served so as to provide different versions of the same program, where each version has a different rating. For example, the default data stream may be unedited; a first alternate data stream may provide a PG-rated version; and a second alternate data stream may provide a G-rated version.

Network operator 102 formats the received default content, alternate content, and metadata, and transmits multiple data streams over network 106 to client devices 108 and 110. For example, for a particular television program, network operator 102 may transmit a default data stream 112 and two alternate data streams, such as alternate data stream "A" 114 and alternate data stream "B" 116. In an exemplary implementation default data stream 112 includes triggers that specify when alternate content is available on alternate data stream "A" 114 or alternate data stream "B" 116, and to whom the available alternate content should be targeted. In an alternate implementation, metadata specifying available alternate content and when and to whom it should be presented is transmitted from network operator 102 to client devices 108 and 110 over an out-of-band network, rather than as part of the default data stream.

In an exemplary implementation, network 106 is implemented as an IP network, such as the Internet. However, it is recognized that other types of networks may also be implemented to support in-program content targeting as described herein. For example, an alternate implementation may utilize an over-air digital terrestrial television (DTT) link in place of an IP network.

FIG. 1 illustrates how the same media content may be transmitted to multiple client devices, but presented differently by each of the client devices. When client device 108 receives default data stream 112, the media content contained in default data stream 112 is presented, for example, via display device 118. At the same time, client device 110 also receives and presents media content from default data stream 112 via display device 120. This is indicated in FIG. 1 as "Segment 1 Default Content" 122. At some point in default data stream 112, client devices 108 and 110 detect a trigger indicating that alternate content is available on alternate data stream "A" 114 and on alternate data stream "B" 116 for two upcoming segments. Client device 108 compares metadata associated with the detected trigger to profile data 124 and client device 110 compares metadata associated with the detected trigger to profile data 126. In the illustrated example, client device 108 determines that metadata for the segment two alternate content available on alternate data stream "B" 116 matches profile data 124, and client device 110 determines that metadata for the segment two alternate content available on alternate data stream "A" 114 matches profile data 126. Accordingly, client device 108 begins receiving and presenting media content associated with segment two from alternate data stream "B" 116, while client device 110 begins receiving and presenting media content associated with segment two from alternate data stream "A" 114.

Client device 108 then switches to alternate data stream "A" 114 to receive and present media content associated with segment three. When no alternate content is available or metadata associated with the available alternate content does not match profile data 124, client device 108 switches back to default data stream 112. Similarly, after presenting the segment two alternate content from alternate data stream "A" 112, client device 110 receives and presents default content from default data stream 112 for segments three and four.

Figure 2:
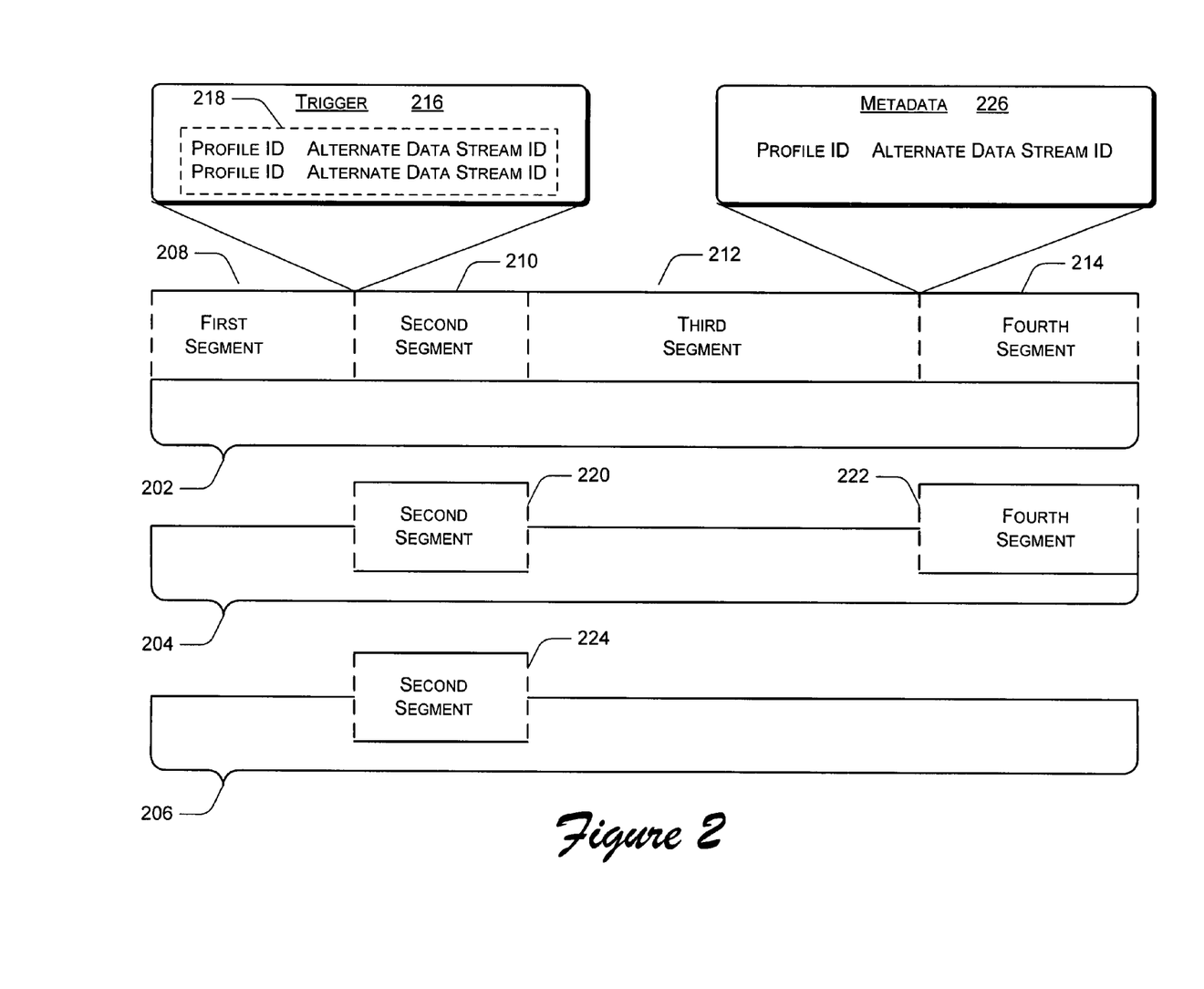
FIG. 2 is a block diagram that illustrates an exemplary relationship between a default data stream and two alternate data streams.

FIG. 2 illustrates an exemplary relationship between a default data stream 202, a first alternate data stream 204, and a second alternate data stream 206. Exemplary default data stream 202 includes segments of media content, which, when taken together, make up a program, movie, or other complete media item. For example, default data stream 202 includes first segment 208, second segment 210, third segment 212, and fourth segment 214. Prior to second segment 210, default data stream 202 includes trigger 216, which includes metadata 218 that indicates available alternate content for an upcoming segment that may be targeted.

For example, alternate data stream 204 includes second segment alternate content 220, which corresponds to default second segment 210; and fourth segment alternate content 222, which corresponds to default fourth segment 214. Similarly, alternate data stream 206 includes second segment alternate content 224, which corresponds to default second segment 210. Accordingly, trigger 216, inserted in default data stream 202, indicates that alternate content is available to replace default second segment 210, and also indicates one or more profile IDs to be used to target the alternate content to a user. Similarly, trigger 226, inserted in default data stream 202, indicates that alternate content is available to replace default fourth segment 214, and also indicates one or more profile IDs to be used to target the alternate content to a user.

In an alternate implementation, rather than targeting segments of a program, entire programs may be targeted. For example, a default data stream may include a particular television program while an alternate data stream may include a different television program. The alternate television program may be targeted to viewers who, for one reason or another, are expected to be more interested in the alternate program than the default program.

Figure 3:
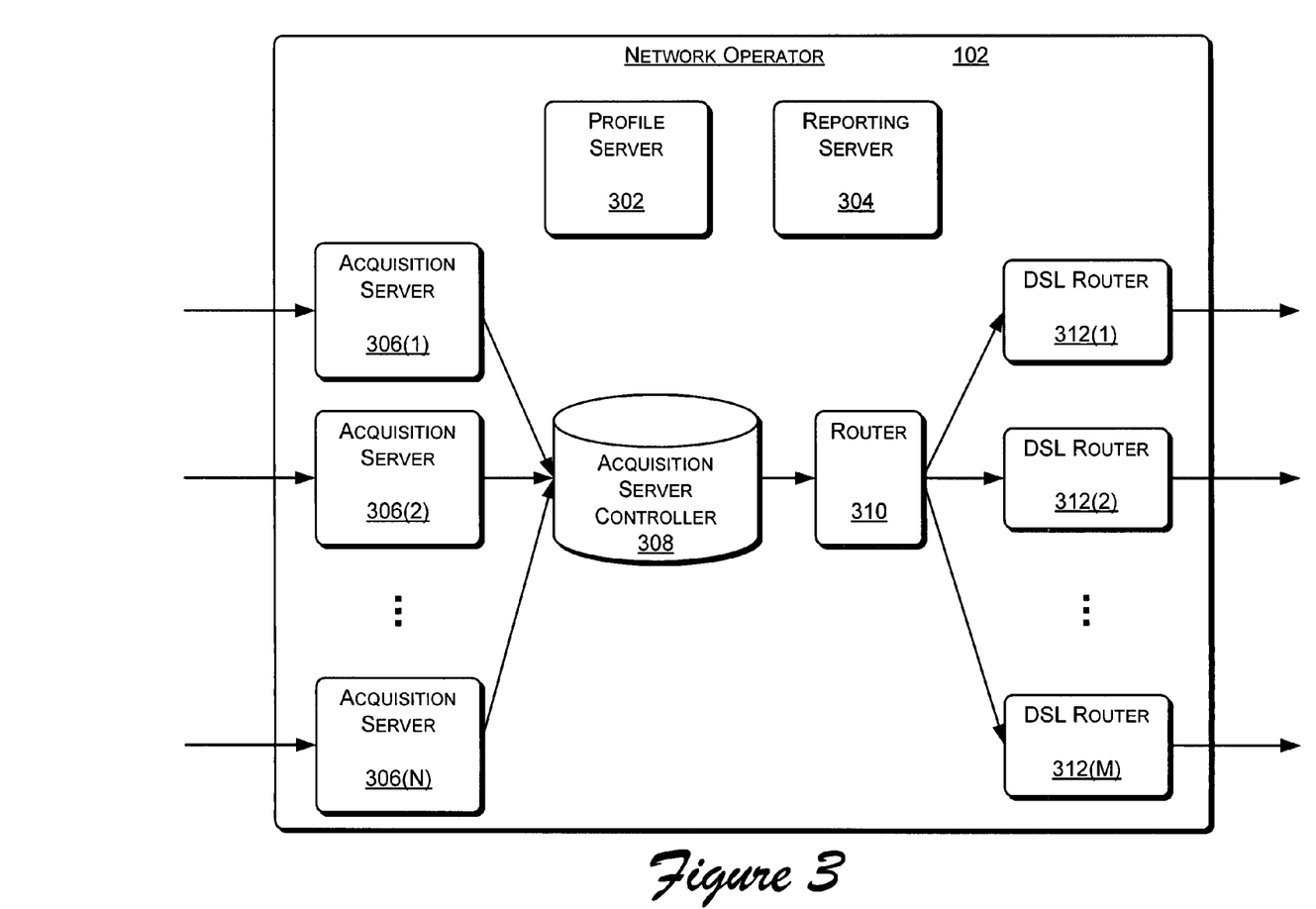
FIG. 3 is a block diagram that illustrates select components of an exemplary network operator configured to implement in-program content targeting.

FIG. 3 illustrates select components and data flow through an exemplary network operator 102 implemented to support in-program content targeting as described herein. Network operator 102 includes profile server 302, reporting server 304, one or more acquisition servers 306(1), 306(2), . . . , 306(N), data formatting module 308, router 310, and one or more digital subscriber line (DSL) routers 312(1), 312(2), . . . , 312(M). Profile server 302 assigns profiles to client devices 108 and 110. For example, profile server 302 may assign a particular profile to a client device based on a geographical location (e.g., a zip code) associated with the client device. Alternatively, demographic or psychographic data associated with a subscriber may be used to determine a profile to be associated with the client device. Any number of techniques and/or data well known to those skilled in the art may be used to determine a profile to be associated with a client device.

When a client device accesses targeted media content, the client device reports a record of the alternate content that was accessed to reporting server 304. Reporting server 304 can then compile the alternate content access records to generate a report and/or bill to be transmitted to one or more media sources 104. This reporting mechanism provides important feedback to media source 104, which indicates, for example, a degree to which available alternate content has been accessed. Acquisition servers 306 are each configured to receive media content to be made available to one or more end users. For example, acquisition servers 306 may receive media content from media sources 104.

In an exemplary implementation, an acquisition server 306 receives default and alternate content data streams from a media source 104. A received default data stream may include encoded trigger metadata that specifies timing information, unique program IDs, and targeting profile IDs associated with alternate content streams. Based on a received data stream, acquisition server 306 generates a rights-managed multicast stream. Sets of rights-managed multicast streams are organized into service collections. A service collection contains a default multicast stream, and one or more associated alternate multicast streams.

Acquisition server controller 308 maintains a mapping between the unique program IDs associated with the alternate content data streams and the service collections that carry the alternate content multicast streams. When acquisition server 306 detects an embedded trigger in a default data stream it queries acquisition server controller 308 and replaces the unique program ID with an identifier associated with the appropriate service collection that includes the identified alternate content stream.

The service collections of default data streams and associated alternate data streams are then forwarded to router 310, which then forwards the data streams to one or more of DSL routers 312(1), 312(2), . . . , 312(M). Each DSL router 312 transmits data over an IP network (e.g., IP network 106, shown in FIG. 1) for receipt by one or more client devices.

Figure 4:
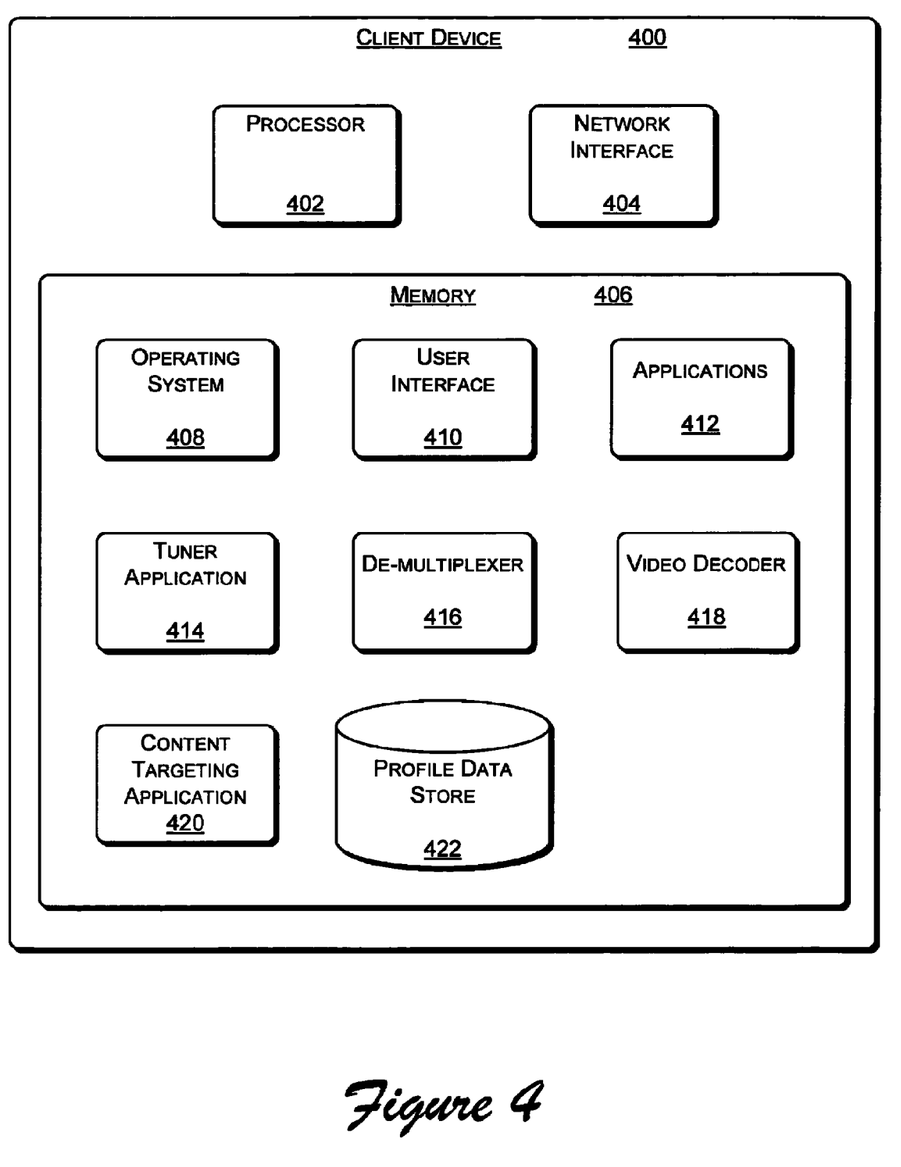
FIG. 4 is a block diagram that illustrates select components of an exemplary client device configured to implement in-program content targeting.

FIG. 4 illustrates selected components of an exemplary client device 400 configured to implement in-program content targeting. Client device 400 includes processor 402, network interface 404, and memory 406. An operating system 408, a user interface 410, and one or more applications 412 are stored in memory 406 and executed on processor 402. Applications 412 may include, for example, an electronic program guide application. Tuner application 414, de-multiplexer 416, and video decoder 418 are also stored in memory 406 and executed on processor 402. Tuner application 414 is configured to tune to, or otherwise access, a particular data stream via which media content may be received. De-multiplexer 416 and video decoder 418 process the received media content, and format it for presentation, such as via a display device.

Content targeting application 420 is also stored in memory 406 and executed on processor 402. Content targeting application 420 detects a trigger indicating available alternate content, and compares metadata associated with the trigger with profile data stored in profile data store 422, which is also stored in memory 406. Client device 400 may be implemented as any of a variety of devices capable of receiving media content via an IP network, including, but not limited to, a television set-top box, a tuner-less IP-enabled television, a personal computer, or a media center.

Methods for in-program content targeting may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
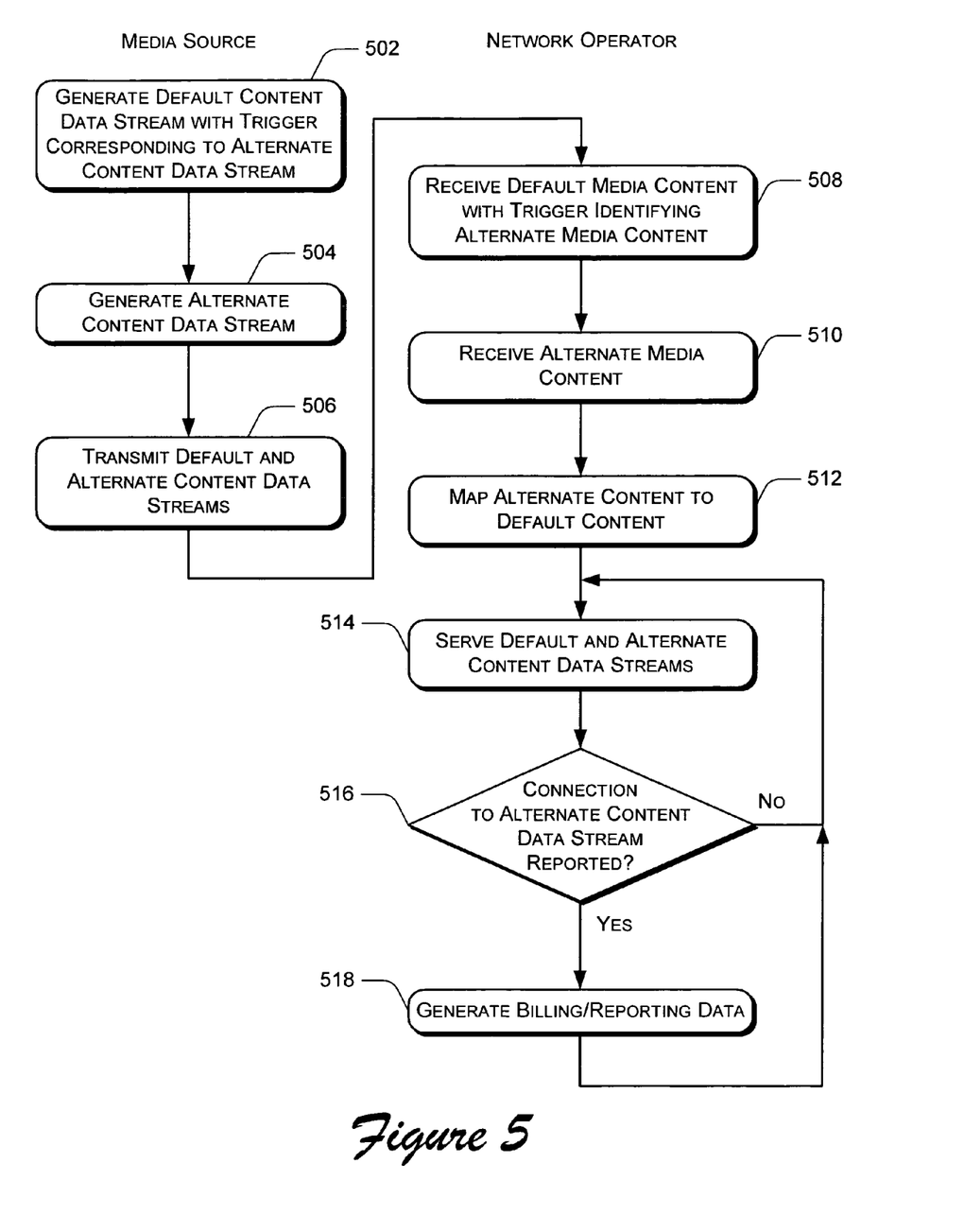
FIG. 5 is a flow diagram that illustrates an exemplary method for generating data streams to support in-program content targeting.
Figure 6:
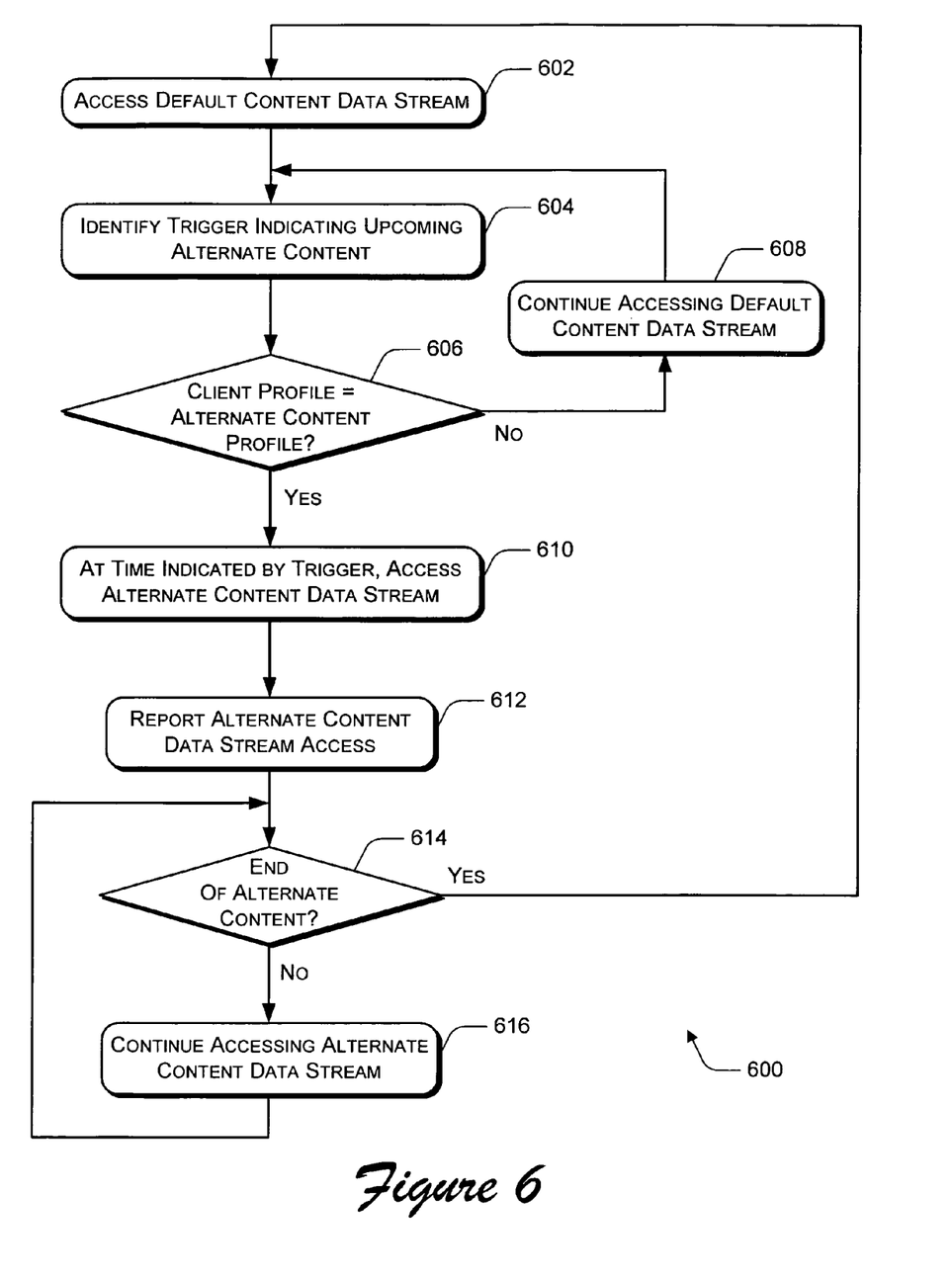
FIG. 6 is a flow diagram that illustrates an exemplary method for targeting in-program content.

FIGS. 5 and 6 illustrate exemplary methods for implementing in-program content targeting. FIGS. 5 and 6 are specific examples of in-program content targeting, and are not to be construed as limitations. Furthermore, it is recognized that various embodiments may implement any combination of the methods illustrated in FIGS. 5 and 6 or any combination of portions of the methods illustrated in FIGS. 5 and 6.

FIG. 5 illustrates an exemplary method 500 for generating data streams to support in-program content targeting. The order in which the method is described is not intended to be construed as a limitation, and any number of the described method blocks can be combined in any order to implement the method. Furthermore, the method can be implemented in any suitable hardware, software, firmware, or combination thereof.

In an exemplary implementation, blocks 502, 504, and 506 represent processing performed by a media source, such as media source 104; while blocks 508-518 represent processing performed by a network operator, such as network operator 102. At block 502, a default content data stream, including a trigger identifying at least one segment of alternate media content, is generated.

At block 504, an alternate media content data stream is generated. For example, media source 104 generates a data stream that includes the alternate media content referenced in the trigger described above with reference to block 502.

At block 506, the default data stream and the alternate data stream are transmitted. For example, media source 104 transmits the generated data streams to an acquisition server 308 associated with network operator 102.

At block 508, default media content and a trigger identifying alternate media content are received. For example, network operator 102 receives a default data stream that includes metadata formatted as a trigger via acquisition server 308 from media source 104.

At block 510, alternate media content is received. For example, network operator 102 receives an alternate data stream via acquisition server 308 from media source 104.

At block 512, the received alternate media content is mapped to the received default media content. For example, when received from media source 104, the default data stream and alternate data stream may each have an associated program identifier. In an exemplary implementation, acquisition server 308 generates a default multicast stream from the received default data stream and an alternate multicast stream from the received alternate data stream. Each generated multicast stream is assigned a stream identifier. Acquisition server controller 308 maps a program ID associated with each of the received default and/or alternate data streams to the stream identifier associated with the respective generated multicast stream. This mapping provides a mechanism by which the alternate content, found in one multicast stream, can be associated with the default media content, found in another multicast stream.

At block 514, the default and alternate multicast streams are served. For example, router 310 forwards the default and alternate multicast streams to DSL routers 312, which transmit the multicast streams to client devices via an IP network.

At block 516, it is determined whether or not a connection to an alternate multicast stream has been reported. For example, reporting server 304 determines whether or not an alternate content connection report has been received.

If no alternate content data stream connection has been reported (the "No" branch from block 516), then processing continues as described above with reference to block 514. On the other hand, if a connection to an alternate content data stream has been reported, then at block 518, reporting and/or billing data is generated. For example, reporting server 304 may generate a bill and/or report to be transmitted, or otherwise presented, to a media source 104.

FIG. 6 illustrates an exemplary method 600 for targeting in-program content. The order in which the method is described is not intended to be construed as a limitation, and any number of the described method blocks can be combined in any order to implement the method. Furthermore, the method can be implemented in any suitable hardware, software, firmware, or combination thereof.

At block 602, a default content data stream is accessed. For example, tuner application 414 accesses default data stream 202.

At block 604, a trigger indicating upcoming alternate content is identified. For example, content targeting application 420 detects trigger 216 within default data stream 202.

At block 606, it is determined whether or not client profile data matches a profile associated with the upcoming alternate content. For example, content targeting application 420 compares metadata 218 with data stored in profile data store 422. If the profile associated with the alternate content does not match the profile associated with the client device (the "No" branch from block 606), then at block 608, access to the default content data stream continues.

On the other hand, if the profile data associated with the alternate content does match the profile data associated with the client device (the "Yes" branch from block 606), then at block 610, an alternate content data stream is accessed. For example, at a time indicated by trigger 216, tuner application 414 begins accessing alternate data stream 204 or alternate content data stream 206.

At block 612, access to the alternate content data stream is reported. For example, content targeting application 420 transmits a report to reporting server 304, indicating that a particular alternate data stream has been accessed.

At block 614, it is determined whether or not the end of the targeted alternate content has been reached. For example, content targeting application 420 detects the end of the targeted alternate content, based on metadata associated with trigger 216 or based on data encoded in the alternate content data stream.

Access to the alternate content data stream continues (the "No" branch from block 614) until the end of the alternate content is detected. When the end of the alternate content is detected (the "Yes" branch from block 614), processing continues as described above with reference to block 602.

Figure 7:
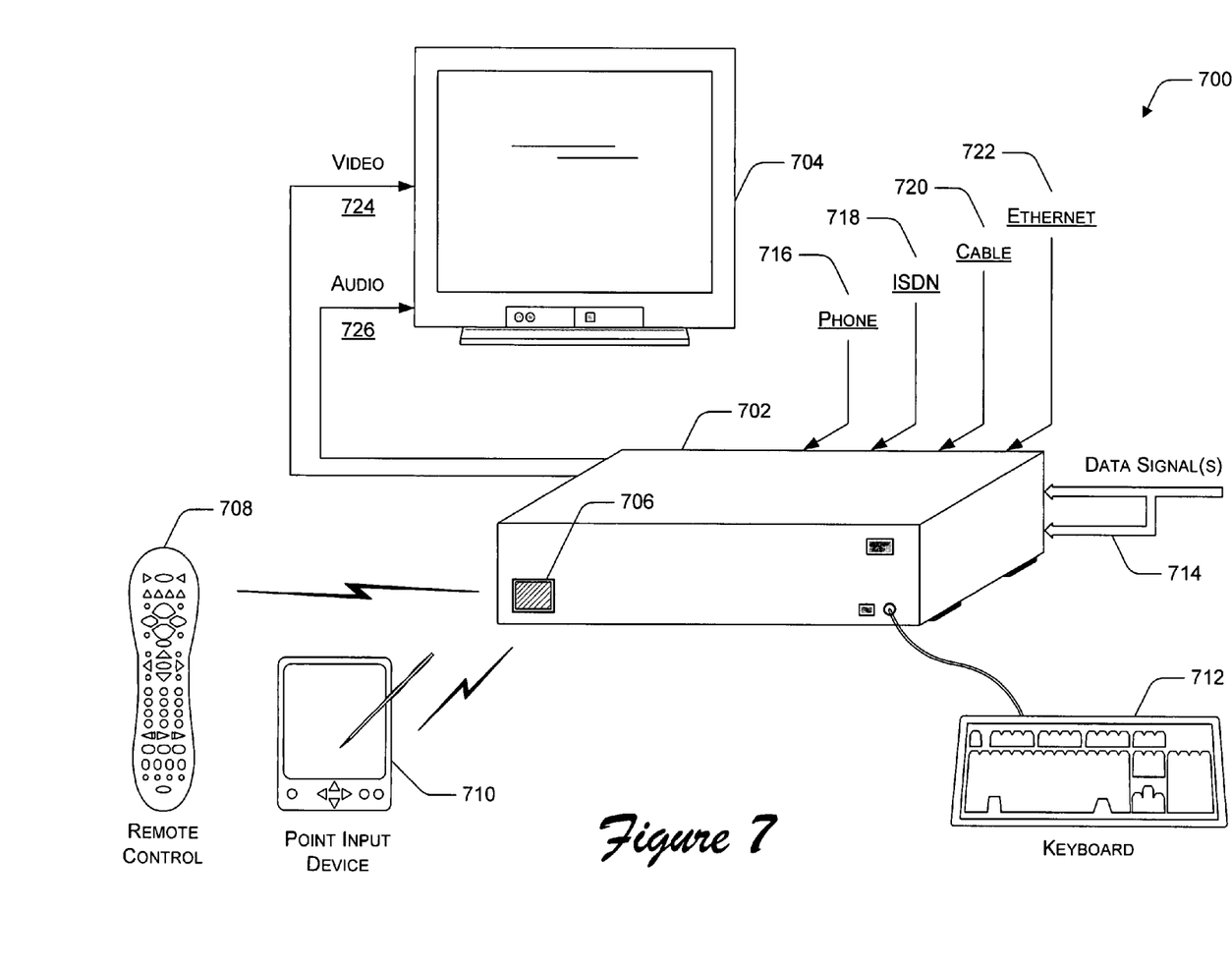
FIG. 7 is a pictorial diagram that illustrates select components of an exemplary media system environment in which in-program content targeting may be implemented.

FIG. 7 illustrates an exemplary environment 700 in which in-program content targeting may be implemented. Exemplary client device 702 is shown as a standalone unit that connects to a display device 704 (e.g., a television). Client device 702 can be implemented in any number of embodiments, including as a set-top box, a game console, an information appliance, and so on. Client device 702 includes a wireless receiving port 706, such as an infrared (IR) or Bluetooth wireless port, for receiving wireless communications from a remote control device 708, a handheld input device 710, or any other wireless device, such as a wireless keyboard. Handheld input device 710 can be a personal digital assistant (PDA), handheld computer, wireless phone, or the like. Additionally, a wired keyboard 712 may be coupled to communicate with the client device 702. In alternate embodiments, remote control device 708, handheld device 710, and/or keyboard 712 may use an RF communication link or other mode of transmission to communicate with client device 702.

Client device 702 receives media content in the form of data signals 714 via a network, such as the Internet or an over-air DTT link. Client device 702 includes hardware and/or software for receiving and decoding data signals 714, such as an MPEG-2, VC-1, H264AVC, or other media system data signal.

Client device 702 is capable of communicating with other devices via one or more connections including a conventional telephone link 716, an ISDN link 718, a cable link 720, and an Ethernet link 722. Client device 702 may use any one or more of the various communications links 716-722 at a particular instant to communicate with any number of other devices. For example, any of communications links 716-722 may be implemented to enable client device 702 to report connections to alternate data streams back to the network operator.

Client device 702 generates video signal(s) 724 and audio signal(s) 726, both of which are communicated to display device 704. The video signals and audio signals can be communicated from client device 702 to display device 704 via an RF (radio frequency) link, S-video link, composite video link, component video link, high-definition multimedia interface (HDMI), digital video interface (DVI), or other communication link. Although not shown in FIG. 7, client device 702 may include one or more lights or other indicators identifying the current status of the device. Additionally, the client device may include one or more control buttons, switches, or other selectable controls for controlling operation of the client device.

Although embodiments of in-program content targeting have been described in language specific to structural features and/or methods, it is to be understood that the subject of the appended claims is not necessarily limited to the specific features or methods described. Rather, the specific features and methods are disclosed as exemplary implementations of in-program content targeting.

The invention claimed is:

1. A method implemented at least in part by a computing device, the method comprising:
generating a default data stream as a rights-managed multicast stream, the default data stream comprising default media content corresponding to first and second segments of a media program;
generating an alternate content data stream as a rights-managed multicast stream, the alternate content data stream comprising alternate media content that:
corresponds to the second segment of the media program, but does not correspond to the first segment of the media program; and
includes a program ID and content profile data for targeting the alternate media content to a viewer;
embedding a trigger in the default data stream, wherein the trigger:
indicates that the alternate media content is available to replace the second segment of the default media content; and
includes a target profile ID, the target profile ID being associated with the content profile data of the alternate media content and being used to target the alternate media content to the viewer;
organizing the default data stream and the alternate content data stream into a service collection of rights-managed multicast streams;
transmitting the default data stream as a first rights-managed multicast stream and the alternate content data stream as a second rights-managed multicast stream, the first rights-managed multicast stream being separate from the second rights-managed multicast stream;
mapping the rights-managed multicast streams of the service collection, wherein the mapping provides an association between the alternate media content and the default media content of the service collection;
mapping the program IDs of the alternate content data stream and at least two service collections carrying alternate content data streams;
serving the first and second rights-managed multicast streams over a network to at least one client device, such that the client device can access the default data stream to enable presentation of the default media content corresponding to the first segment of the media program and dynamically access the alternate content data stream to enable presentation of the alternate media content instead of the default media content corresponding to the second segment of the media program;

reporting a connection to the alternate content data stream, the reporting being an alternate content access record;

compiling a report of the alternate content access records indicating a degree to which each alternate content data stream has been accessed; and generating a bill based on the report of the alternate content access records.

2. The method as recited in claim 1, wherein the client device dynamically accesses the alternate content data stream based on the content profile data and at least one trigger.

3. The method as recited in claim 1, wherein the media program comprises at least one of a television program or a movie.

4. The method as recited in claim 1, wherein the alternate media content comprises a program segment that may be targeted based on at least one of a geographic location, a demographic characteristic, or a psychographic characteristic.

5. The method as recited in claim 1, wherein the alternate media content comprises a program segment that may be targeted based on the profile of a viewer.

6. The method as recited in claim 1, wherein the alternate media content comprises a portion of the media program.

7. The method as recited in claim 1, wherein the alternate media content comprises:
 a portion of the media program; and
 an advertisement.

8. The method as recited in claim 1, wherein the alternate media content comprises an alternate media program.

9. A system comprising:
 a processor;
 a memory;
 a tuner application, stored in the memory and executed on the processor, configured to provide access to a plurality of media data streams, the plurality of media streams include at least one default data stream and at least one alternate content data stream, wherein the default data stream and the alternate content data stream are multicast streams;
 a profile data store configured to maintain user profile data including whether the user has opted-in for content targeting;
 a content targeting application configured to, when the user has opted-in for content targeting:
  detect a trigger embedded in the at least one default data stream over which a media program is being received, the trigger being encoded metadata indicating that the at least one alternate content data stream corresponds to a segment of the media program of the default data stream, the trigger having a target profile ID associated with the alternate content data stream for replacing at least one segment of the default data stream;
  compare the target profile ID with the user profile data; and
  in an event that the alternate content profile data matches the user profile data, direct the tuner application to access the alternate content data stream instead of the default data stream for at least a portion of the media program.

10. A system as recited in claim 9, wherein the media program comprises at least one of a television program or a movie.

11. A system as recited in claim 9, wherein the trigger is detected within the default data stream.

12. A system as recited in claim 9, wherein the trigger is detected within an out-of-band data stream.

13. A system as recited in claim 9, wherein:
 the content profile data represents at least one of a demographic characteristic, a psychographic characteristic, or a geographic location; and
 the user profile data represents at least one of a demographic characteristic, a psychographic characteristic, or a geographic location.

14. A system as recited in claim 9, implemented as at least one of a television set-top box, a personal computer, or a media center.

15. One or more computer-readable media comprising computer-readable instructions which, when executed, cause a computer system to perform operations comprising:
 maintaining user profile data associated with a user of the computer system;
 accessing a service collection of rights-managed multicast streams, wherein the service collection includes a default data stream and at least one alternate data stream;
 receiving from the service collection a first segment of a media program from the default data stream;
 detecting a trigger embedded in the default data stream, the trigger identifying the at least one alternate data stream;
 accessing the trigger to determine alternate content is available from the alternate data stream for a second segment of the media program;
 accessing the trigger to identify content profile data associated with the alternate content;
 determining, based on a comparison of the user profile data and the content profile data, to present the alternate content;
 accessing the alternate data stream transmitted with the default data stream;
 receiving from the service collection the alternate content;
 rendering the alternate content;
 responsive to rendering the alternate content, noting alternate content information including a time, program identifier, and target group consistent with the user profile data;
 sending the alternate content information to a reporting server; and
 switching from the alternate data stream to the default data stream when the content profile data does not match the user profile data.

16. The one or more computer-readable media as recited in claim 15, the operations further comprising:
 detecting the end of the alternate content; and
 accessing the default data stream again to receive a third segment of the media program.

17. The one or more computer-readable media as recited in claim 15, wherein the media program comprises at least one of a television program or a movie.

18. The one or more computer-readable media as recited in claim 15, wherein the alternate content comprises at least one of a segment of a television program, a segment of a movie, an alternate television program, or an alternate movie.

19. The one or more computer-readable media as recited in claim 18, wherein the alternate content further comprises an advertisement.

20. The one or more computer-readable media as recited in claim 15, wherein the user profile data comprises at least one of a demographic characteristic associated with a user of the computer system, a psychographic characteristic associated with a user of the computer system, or a geographic location associated with the computer system.

21. The method as recited in claim 1, wherein the trigger further includes encoded metadata specifying timing information and program IDs associated with the alternate content data stream for replacing the second segment of the default media content with the alternate media content.

22. The method as recited in claim 1, wherein the first rights-managed multicast stream and the second rights-managed multicast stream are assigned at least one stream identifier, wherein the stream identifier provides an association between the default media content of the default data stream with the alternate media content of the alternate content data stream.

* * * * *